No. 707,921. Patented Aug. 26, 1902.
G. B. HALL.
MACHINERY FOR MAKING SLABS WITH PLAIN OR ORNAMENTAL SURFACES OF PLASTIC CEMENT OR COMPOSITION.
(Application filed Apr. 30, 1902.)
(No Model.) 4 Sheets—Sheet 2.
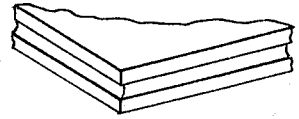
FIG. 6.
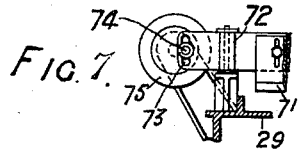
FIG. 7.
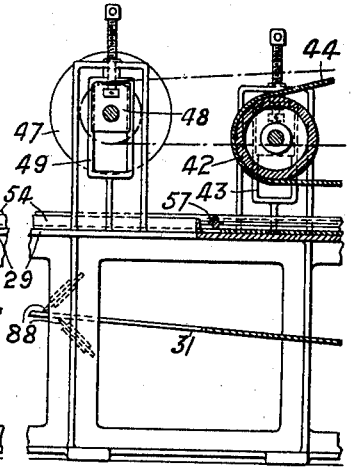
FIG. 1ᵇ.
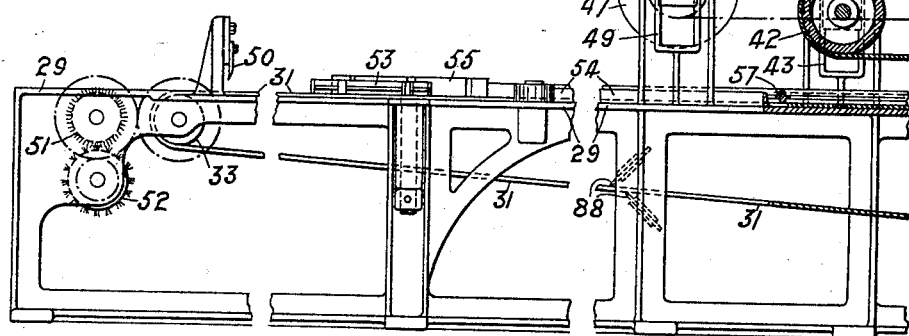
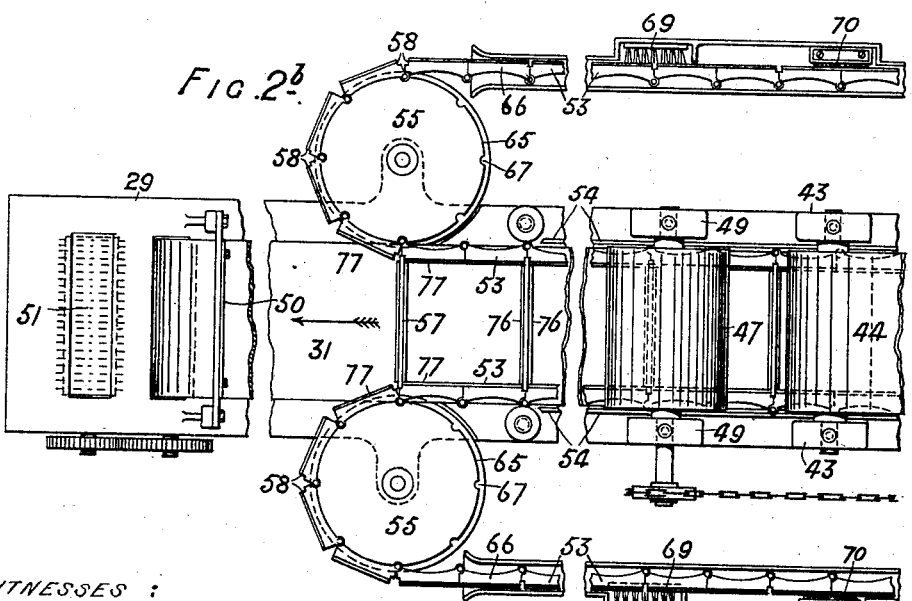
FIG. 2ᵇ.
WITNESSES:
W. M. Avery
H. J. Bernhard
INVENTOR
George B. Hall
BY
ATTORNEYS.

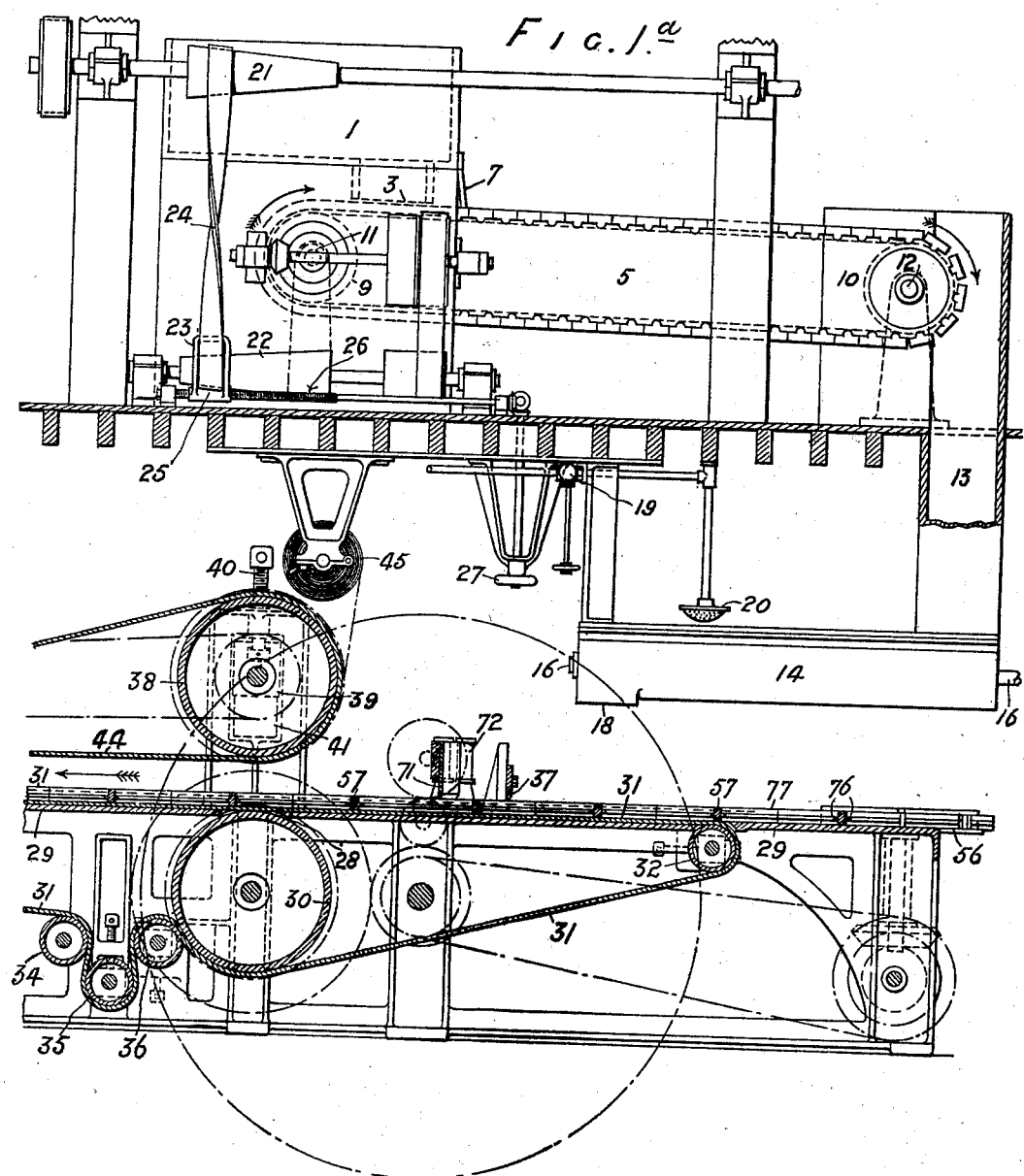

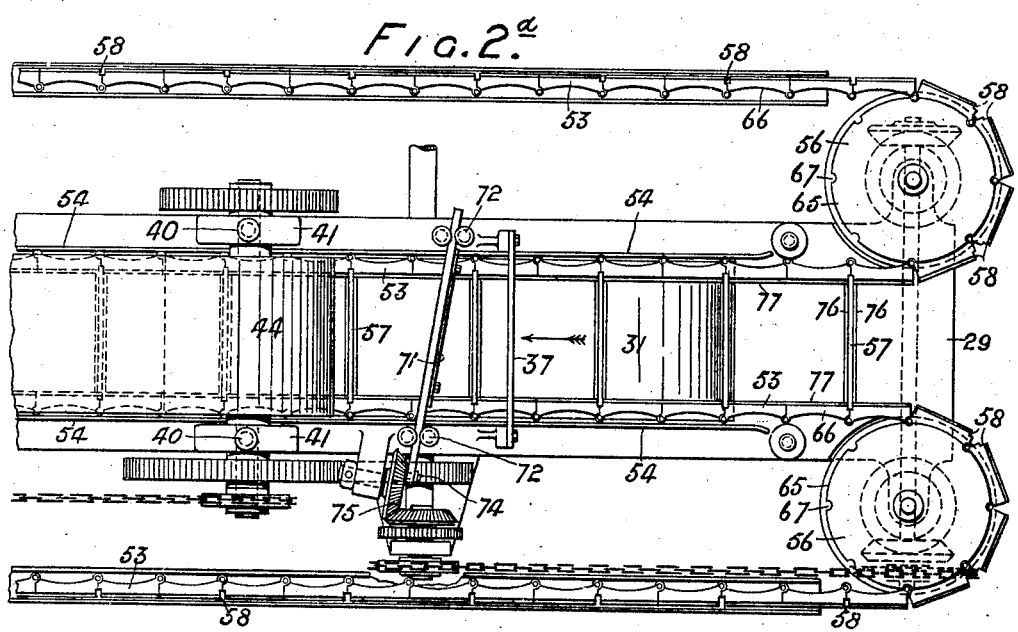

No. 707,921. Patented Aug. 26, 1902.
G. B. HALL.
MACHINERY FOR MAKING SLABS WITH PLAIN OR ORNAMENTAL SURFACES OF PLASTIC CEMENT OR COMPOSITION.
(Application filed Apr. 30, 1902.)

(No Model.) 4 Sheets—Sheet 4.

WITNESSES:
W. M. Avery
N. J. Bernhard

INVENTOR
George B. Hall
BY
Munn
ATTORNEYS.

UNITED STATES PATENT OFFICE.

GEORGE BERRINGER HALL, OF LONDON, ENGLAND.

MACHINERY FOR MAKING SLABS WITH PLAIN OR ORNAMENTAL SURFACES OF PLASTIC CEMENT OR COMPOSITION.

SPECIFICATION forming part of Letters Patent No. 707,921, dated August 26, 1902.

Application filed April 30, 1902. Serial No. 105,326. (No model.)

*To all whom it may concern:*

Be it known that I, GEORGE BERRINGER HALL, surveyor, a subject of the King of Great Britain, residing at "Valkyrie," Colney Hatch Lane, Muswell Hill, London, England, have invented new and useful Improvements in Machinery for Making Slabs with Plain or Ornamental Surfaces of Plastic Cement or Composition, of which the following is a full, clear, and exact description.

My invention relates to improvements in apparatus for making molded slabs or blocks of plaster, cement, or other quick-setting composition for use in the construction of walls, ceilings, roofs, damp courses, and for other purposes, the plastic material being delivered in a continuous stream to a continuous series of molds formed by an endless traveling apron, traveling side fences, and cross-division bars.

The invention will be described with reference to the accompanying drawings, forming part of this specification, which show a machine adapted either for forming a continuous sheet by rolling or a series of separate slabs by molding.

Figure 3:
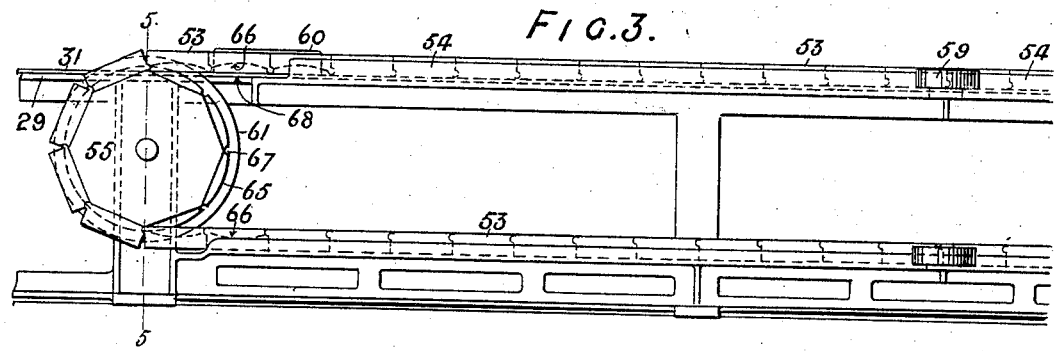
Figure 4:
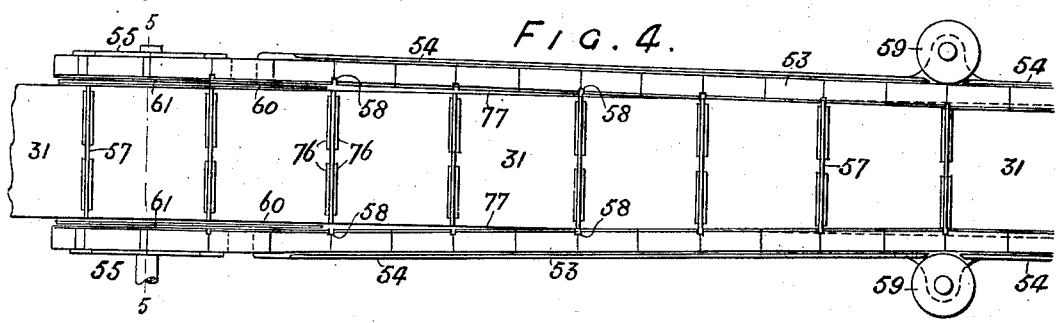
Figure 5:
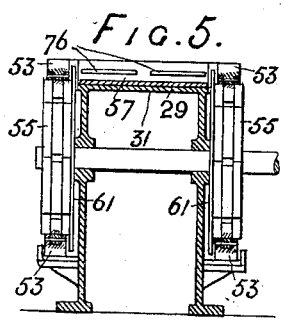
Figure 8:
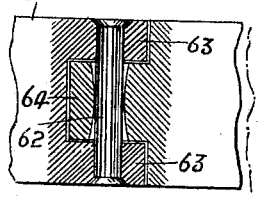

Figures $1^a$ and $1^b$ together form a longitudinal side elevation of the apparatus, partly in section, portions of the length being broken out. Figs. $2^a$ and $2^b$ together form a corresponding plan view, the mixing apparatus being omitted. Figs. 3 and 4 show, respectively in side elevation and plan, part of a modified form of the same machine. Fig. 5 is a cross-section on line 5 5 of Figs. 3 and 4. Fig. 6 is a perspective view of part of a plain slab with grooved edges. Fig. 7 shows a detail of the screeding-bar mechanism, and Fig. 8 is a detail of one form of traveling side fence.

The ingredients of the material are supplied from separate bins 1 through apertures 3 to conveyers 5, each formed of an endless chain of boxes, running on pulleys 9 10 on shafts 11 12 and passing below a striker 7. The boxes discharge through a chute 13 into a mixing-trough 14, wherein shafts 16, provided with pallets, are rotated, so as to mix the materials and convey them to the discharge-outlet 18.

Water supplied through a valve 19 is sprayed from a rose 20 onto the completely-mixed materials, the plastic mass being discharged from the outlet 18. Each conveyer may be driven by coned speed-pulleys 21 22, belt 24, belt-fork 23, and nut 25, adjusted by screw 26, which is rotated by hand-wheel 27.

The plastic material delivered to the apparatus is formed into either a continuous sheet or a succession of slabs by apparatus comprising a long horizontal table 29, having an aperture 28, (see Fig. $1^a$,) in which a transverse lower roller 30 rotates flush with the table. The plastic material is delivered upon an endless band of rubber-faced canvas 31, which passes over the roller 30, along the table, and over rollers 32 33, whereof 32 is adjustable. The band is maintained in driving contact with the roller 30 by rollers 34 35 36, whereof one or more may be adjustable to take up slack and one is adapted to hold the band 31 in driving contact with roller 30. The plastic material is carried by the band 31 beneath a transverse fixed gage-bar or striker 37, vertically adjustable and serving to spread, consolidate, and roughly gage the thickness of the material. The bar 37 may have its face so curved as to present to the material a flaring gateway, or the acting edge of the bar may be V-shaped, as shown by Fig. $1^a$. When the plastic material is to be formed into a continuous sheet, it passes from the gage-bar 37 beneath a pressure-roller 38, rotated at the same surface speed as the band 31 and mounted directly above the roller 30 in bearing-blocks 39, adjustable by screws 40 in vertical guides 41 for regulating the thickness of the sheet and for permitting the roller 38 to be lifted, as shown, out of work when not required. Around this roller 38 and a tension-roller 42, similarly mounted adjustably in guides 43, runs a rubber-faced endless band 44, which may carry a design formed in relief or intaglio upon its acting surface, the second roller 42 when in operation being preferably so set as to cause the pressure transmitted to the plastic material through the band 44 to gradually diminish as the plastic material becomes set, the plastic material during the processes of spreading and pressing being confined laterally between parallel side fences which determine the width of the sheet and preserve the smoothness of its edges. The roller 42 is set at such a height as will enable the sheet or slab of plastic material to pass clear beneath the band 44 at that point. 45 is a roll of paper or fabric which may be applied between the sheet and the band 44, as indicated. The sheet is partially divided transversely at intervals by a guillotine-knife mounted to work radially in a transverse roller 47, revolving in bearings 48 vertically adjustable in guides 49, so that it may be either set to suit the thickness of the sheet to be cut or be raised out of the way, as shown by Fig. 1$^b$, when not required. The roller 47 is positively driven and the knife is retracted by springs, so that its edge is normally housed within the roller, except at the proper moment, when it is caused by a cam or trip mechanism to suddenly protrude from the roller and to thus indent or partially sever the sheet of plastic material. The upper and under surfaces of the sheet may be roughened, the upper surface by a transversely-extending and vertically-adjustable comb 50 and the lower surface by a revolving roller 51, clothed with card-teeth driven from the roller 33 and cleaned by a doffing-brush roller 52, driven at a higher rate of speed.

When the machine is to be used for molding slabs, the slabs are formed in a series of molds, whereof the bottom is constituted by the endless band 31, the sides by lateral fences moving as one with said band, and the ends by cross-divisions engaging with said fences, the upper rollers 38 and 42, the upper band 44, and the cutting-roller 47 being then raised out of the way, as shown in Figs. 1$^a$ and 1$^b$. The lateral traveling fences 33 are formed of endless chains of blocks guided by rails 54 and passing around pairs of sprocket-wheels 55 56, the fences resting upon and traveling with the band 31, one of the pairs of sprocket-wheels being driven by gearing from the main shaft. The sprocket-wheels may either rotate in a horizontal plane, as in Figs. 1 and 2, or in vertical planes, as in Figs. 3, 4, and 5. The plastic material is fed from the mixer onto the endless band 31, the cross-divisions 57 being inserted in place by hand and retained by their ends engaging in pairs of half-grooves 58, provided at the proper intervals between the joints of the fences. The cross-bars 57 on or before reaching the other end of the machine become disengaged from the fences and can then be returned to the feed end of the machine. When the side fences work on horizontally-rotating sprocket-wheels, as in Figs. 1 and 2, the disengagement of the cross-bars from the fences is due to the latter diverging on passing around the pair of sprocket-wheels 55, as shown in Fig. 2$^b$. Where the side fences 53 work over vertically-rotating sprocket-wheels, as in Figs. 3, 4, and 5, means require to be provided for effecting the separation of the cross-bars from the fences before the latter reach the sprocket-wheels 55. For this purpose the fence-chains 53 are kept parallel by the fixed fences 54, terminating at guide-rollers 59, and from this point the fences are caused to gradually diverge laterally and sufficiently to permit of the grooves 58 clearing the ends of the cross-bars 57, the chains being deflected out of the straight course by being led outside of fixed guides 60, whose front faces are wider apart than the opposite ends of the cross-bars 57, the sprocket-wheels 55 being set at a distance apart corresponding to the divergence of the chains and having each a deep flange 61 at the inner side. Owing to the direction of this divergent movement of the fence-chains, provision requires to be made in the joints of the chain for movement in two planes. For this purpose the joints may be formed as shown in Fig. 8, the hinge-pin 62 of each joint being fast in a pair of outer lugs 63 on the one block, while the hole through which the pin passes in the middle lug 64 of the adjacent block is made flaring or bell-mouthed toward both ends to permit of a slight lateral angular movement of the one block relatively to the other, as will be obvious to those skilled in the art. In order to prevent swaying of the chains, that portion 65 of the periphery of each sprocket-wheel upon which bear the blocks forming the chain is preferably made circular, and the back 66 of each block is similarly concaved, driving engagement between the wheel and chain being maintained by the hinges of the blocks being received in corresponding cross-grooves 67 in the periphery of the wheel, as shown in Figs. 2$^a$ and 2$^b$. In Figs. 3, 4, and 5, however, it is the backs of the blocks which rest upon the endless traveling band 31, and in order that these may make a continuous close joint with the band the sides of the blocks are formed by plates presenting in the aggregate a straight continuous edge 68 to the band 31, notwithstanding that the periphery of the sprocket-wheels may be circular and engage with a concavely-curved surface 66 on the back of each block, as before described.

In order to remove any particles of the plastic material which may adhere to the fence-chains, the return portion of each endless chain 53 is cleaned by a brush, as at 69, Fig. 2$^b$. That face of each fence which comes in contact with the plastic material may be lubricated by causing each chain to pass, as at 70, over a lubricating sponge or pad. In order to complete the leveling and consolidation of the plastic material filled into the molds, there is provided behind the gage-bar 37 a second striker or screeding bar 71, (see Figs. 1$^a$, 2$^a$, and 7,) whereof the acting edge is made vertically adjustable, so as to rest upon or pass over and just clear the side fences and cross-bars, this bar being mounted in a position oblique to the direction of travel and caused to reciprocate in the direction of its own length. For this purpose the bar 71 may be held between pairs of flanged rollers 72 and have at one end a vertical slot 73, Fig. 7, engaged by a crank-pin 74, carried by a wheel 75, driven by gearing from the main shaft, as shown. If, as is usual, it is desired to form a keying "frog" or groove in the edges of the slabs, as shown in Fig. 6, a corresponding rib 76 is provided on each face of the cross-division bars 57, and similar ribs 77 are also formed on the inner faces of the chain-blocks constituting the side fences 53, as shown. (See Figs. 2$^a$ and 2$^b$.) It will be evident that the ribs 77 will be drawn out clear of the grooves which they have formed in the edges of the slabs by the same divergent movement of the fences 53 as has been already described as necessary in order to enable the fences to clear the ends of the cross-bars 57.

The means above described for roughening the upper and under surfaces of the continuous sheet of plastic material may also be employed for roughening the surfaces of the slabs when molded separately. The endless band 31 is caused to pass between transverse blades 88, (see Fig. 1$^b$,) which lightly scrape and clean its upper and lower surfaces.

All parts of the apparatus (such as side fences and cross-division bars between slabs, &c.) exposed to contact with the plastic material while the latter is in process of being molded to shape may be faced with vulcanized rubber or other similar substance adapted to permit of the plastic material when set being separated in a clean and neat manner from the surface of said parts.

Having thus described my invention, I claim as new and desire to secure by Letters Patent—

1. A machine for the production from plastic material of a continuous sheet or slab adapted to be divided into predetermined lengths, comprising a flat table, an endless traveling band for receiving the plastic material, means for causing said band to travel continuously over the table, side fences for determining the width of the sheet or slab, a striker for spreading the plastic material upon the band, and a vertically-adjustable screeding-bar mounted to reciprocate in the direction of its own length over the surface of the sheet or slab transversely of the direction of the travel thereof so as to consolidate and level the plastic material to the required thickness, as described.

2. A machine for the continuous production from plastic material of separate slabs, comprising an endless band, a succession of molds for the slabs constituted as to the bottom of each mold by said endless band, as to the sides of the molds by a pair of endless chains of blocks traveling as one with the band, and as to the ends of said molds by cross-division bars engaging with said chains and serving to separate adjacent molds of the series, combined with means for spreading, consolidating and gaging the plastic material fed into the molds, substantially as described.

3. A machine for the continuous production from plastic material of separate slabs, comprising an endless band, cross-division bars extending at intervals across the band, the endless side chains traveling over sprocket-wheels rotating in vertical planes and provided with ribs for molding frogs in the edges of the slabs; said bands, side chains and division-bars coöperating to form a series of molds; and means for causing the side chains to diverge so as to effect the disengagement of said chains from the cross-division bars and of the frog-molding ribs on the chains, from the slabs, substantially as described.

GEORGE BERRINGER HALL.

Witnesses:
C. G. CLARK,
T. W. KENNARD.